United States Patent
Okawachi

(10) Patent No.: US 8,522,834 B2
(45) Date of Patent: Sep. 3, 2013

(54) GAS FILLING DEVICE, GAS FILLING SYSTEM, GAS FILLING METHOD AND MOVING DEVICE

(75) Inventor: Eiji Okawachi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/502,642

(22) PCT Filed: Oct. 19, 2009

(86) PCT No.: PCT/JP2009/005435
§ 371 (c)(1),
(2), (4) Date: Apr. 18, 2012

(87) PCT Pub. No.: WO2011/048621
PCT Pub. Date: Apr. 28, 2011

(65) Prior Publication Data
US 2012/0205003 A1 Aug. 16, 2012

(51) Int. Cl.
*B65B 1/30* (2006.01)
*B65B 31/00* (2006.01)

(52) U.S. Cl.
USPC ................................ 141/95; 141/94; 141/2

(58) Field of Classification Search
None
See application file for complete search history.

(56) References Cited

U.S. PATENT DOCUMENTS

| | | | | |
|---|---|---|---|---|
| 5,479,966 A | * | 1/1996 | Tison et al. | 141/4 |
| 7,128,103 B2 | * | 10/2006 | Mitlitsky et al. | 141/248 |
| 7,568,507 B2 | * | 8/2009 | Farese et al. | 141/95 |
| 7,624,770 B2 | * | 12/2009 | Boyd et al. | 141/11 |
| 7,987,877 B2 | * | 8/2011 | Bavarian et al. | 141/5 |
| 8,286,675 B2 | * | 10/2012 | Farese et al. | 141/94 |
| 2007/0079891 A1 | * | 4/2007 | Farese et al. | 141/94 |

FOREIGN PATENT DOCUMENTS

| JP | 2004-084808 A | 3/2004 |
|---|---|---|
| JP | 2005-155869 A | 6/2005 |
| JP | 2005-226716 A | 8/2005 |

OTHER PUBLICATIONS

International Search Report issued Dec. 15, 2009 in PCT/JP2009/005435.

* cited by examiner

*Primary Examiner* — Timothy L Maust
*Assistant Examiner* — Brandon J Warner
(74) *Attorney, Agent, or Firm* — Kenyon & Kenyon LLP

(57) ABSTRACT

A gas filling device comprises a gas supplier configured to supply the gas to gas filler passages and a controller configured to separately open and close each of the valves provided in the respective gas filler passages, so as to control a gas flow supplied from the gas supplier, wherein the controller comprises a heat dissipation information acquirer configured to obtain heat dissipation information regarding heat dissipation capacity of each of the plurality of tanks and an in-tank information acquirer configured to obtain information regarding at least one of temperature and pressure in each of the plurality of tanks, and the controller is characterized to cause opening and closing the valves to allow communication between the separate gas filler passages, based on the heat dissipation information obtained by the heat dissipation information acquirer and the information in the tank obtained by the in-tank information acquirer.

16 Claims, 10 Drawing Sheets

P1: INITIAL GAS PRESSURE IN TANK
P2: GAS PRESSURE IN TANK AFTER FILLING
Tin: SUPPLIED GAS TEMPERATURE
T1: INITIAL GAS TEMPERATURE IN TANK
T2: GAS TEMPERATURE IN TANK AFTER FILLING
$\gamma$: SPECIFIC HEAT RATIO (1.41 FOR HYDROGEN)

$$T2 = \frac{\gamma \cdot P2 \cdot T1 \cdot Tin}{(P2-P1) \cdot T1 + \gamma \cdot P1 \cdot Tin}$$

GAS FILLING DEVICE, GAS FILLING SYSTEM, GAS FILLING METHOD AND MOVING DEVICE

This is a 371 national phase application of PCT/JP2009/005435 filed 19 Oct. 2009, the contents of which are incorporated herein by reference.

FIELD OF THE INVENTION

The present invention relates to filling a gas from a gas supply device to a gas tank, and more specifically to filling a gas from a gas station to a plurality of gas tanks.

BACKGROUND OF THE INVENTION

One known technique to fill a gas into a plurality of gas tanks is disclosed in PTL1. This method simultaneously fills a fuel gas, such as hydrogen, from a hydrogen station into a plurality of fuel tanks to store the fuel gas in a fuel cell vehicle. The method detects pressure and temperature in each of the fuel tanks and controls opening/closing of valves respectively connecting the hydrogen station with the respective tanks, based on the detected pressure and temperature in each of the fuel tanks.

CITATION LIST

Patent Literature

[PTL1] JP2004-84808 A

SUMMARY OF INVENTION

Technical Problem

The fuel tanks may have different heat dissipation capacities according to their materials and structures or the surrounding environment of their installation location. The fuel tank of the higher heat dissipation capacity facilitates release of heat from the fuel gas in the tank and thereby reduces the temperature increase in the fuel tank. The fuel tank of the lower heat dissipation, on the other hand, has a high temperature increase rate accompanied with a high pressure increase rate in the tank.

In an application of filling hydrogen into a plurality of fuel tanks having different heat dissipation capacities, the prior art method of controlling the start/stop of the fuel gas supply to the respective fuel tanks according to the temperatures and the pressures in the respective fuel tanks may fail to fill the fuel gas efficiently.

The present invention is made to address at least part of the problem described above, and an object of the present invention is to efficiently fill a gas into a plurality of tanks having different heat dissipation capacities.

Solution to Problem

[Aspect 1]
1. A gas filling device configured to fill a gas into a plurality of tanks provided to store the gas through separate gas filler passages with respective valves, the gas filling device comprising:
    a gas supplier configured to supply the gas to the gas filler passages; and
    a controller configured to separately open and close each of the valves provided in the respective gas filler passages, so as to control gas flows supplied from the gas supplier,
    wherein the controller comprises:
        a heat dissipation information acquirer configured to obtain heat dissipation information regarding heat dissipation capacity of each of the plurality of tanks; and
        an in-tank information acquirer configured to obtain information regarding at least one of temperature and pressure in each of the plurality of tanks, and
    wherein the controller causes opening and closing of the valves to sequentially fill the gas into the plurality of tanks one by one, and then to allow communication between the separate gas filler passages after the plurality of tanks are filled with the gas, based on the heat dissipation information obtained by the heat dissipation information acquirer and the information in the tank obtained by the in-tank information acquirer.

The gas filling device of this aspect allows communication between the plurality of tanks having different heat dissipation capacities during gas filling. Even when the temperature or the pressure increases in the tank of the lower heat dissipation capacity, this reduces the temperature increase or the pressure increase and ensures efficient gas filling.

[Aspect 2]
The gas filling device according to aspect 1, wherein after the gas is supplied through the separate gas filler passages to be filled into the plurality of tanks, the heat dissipation information acquirer of the controller calculates and obtains heat dissipation information with respect to each of the plurality of tanks, based on the information obtained by the in-tank information acquirer.

The gas filling device of this aspect readily obtains the heat dissipation information showing which of the tanks has the higher heat dissipation capacity. And the controller refers to this heat dissipation information to ensure efficient gas filling.

[Aspect 3]
The gas filling device according to either one of aspects 1 and 2, wherein
the controller is configured to perform a first gas filling process comprising the steps of;
    (a) filling the gas into a first tank of higher heat dissipation capacity of the plurality of tanks, based on the heat dissipation information;
    (b) stopping the gas filling into the first tank, and filling the gas into a second tank of lower heat dissipation capacity; and
    (c) stopping the gas filling into the second tank, and allowing communication between the first tank and the second tank.

The gas filling device of this aspect fills the gas first into the first tank of the higher heat dissipation capacity and later into the second tank of the lower heat dissipation capacity. This accelerates heat release from the first tank during the gas filling into the second tank. As the result, this allows the gas filling in a shorter time period, thus ensuring the efficient gas filling.

[Aspect 4]
The gas filling device according to aspect 3, wherein
the first gas filling process performed by the controller further comprises the step of
    (d) filling the gas into the first tank and the second tank, after the step (c).

The gas filling device of this aspect increases the amount of gas filling by the additional step (d), so as to ensure the efficient gas filling.

[Aspect 5]

The gas filling device according to either one of aspects 3 and 4, wherein the controller stops the gas filling into the first tank when either gas temperature or gas pressure in the first tank reaches a preset value in the step (b).

The gas filling device of this aspect enables the gas filling to the limit of the first tank, thus ensuring the efficient gas filling.

[Aspect 6]

The gas filling device according to any one of aspects 3 to 5, wherein the controller stops the gas filling into the second tank when either gas temperature or gas pressure in the second tank reaches a preset value in the step (c).

The gas filling device of this aspect enables the gas filling to the limit of the second tank, thus ensuring the efficient gas filling.

[Aspect 7]

The gas filling device according to any one of aspects 3 to 6, wherein the controller is further configured to perform a second gas filling process of simultaneously filling the gas into the first tank and the second tank, and the controller selectively performs either the first gas filling process or the second gas filling process, based on the information in the tank prior to gas filling, which is obtained by the in-tank information acquirer.

The gas filling device of this aspect enables selection of the more efficient gas filling process, based on the tank condition prior to gas filling, between the first gas filling process of sequentially filling the gas into the first tank and into the second tank and the second gas filling process of simultaneously filling the gas into the first tank and the second tank.

[Aspect 8]

The gas filling device according to aspect 7, wherein the controller performs the second gas filling process when pressures in the first tank and in the second tank prior to the gas filling are not greater than a preset pressure level which is determined according to temperatures in the first tank and in the second tank.

The gas filling device of this aspect enables selection of the more efficient gas filling process.

[Aspect 9]

A gas filling system configured to supply a gas from a gas filling device to a moving device, the gas filling system comprising the moving device and the gas filling device, the moving device comprising:

a plurality of tanks configured to store the supplied gas;

separate gas filler passages connected with the plurality of tanks; and valves provided in the separate gas filler passages, wherein the gas filling device comprises a gas supplier configured to supply the gas to the gas filler passages, at least one of the moving device and the gas filling device comprises a controller configured to separately open and close each of the valves, so as to control a gas flow supplied from the gas supplier to corresponding one of the gas filler passages, wherein the controller comprises:

a heat dissipation information acquirer configured to obtain heat dissipation information regarding heat dissipation capacity of each of the plurality of tanks; and an in-tank information acquirer configured to obtain information regarding at least one of temperature and pressure in each of the plurality of tanks, and the controller causes opening and closing of the valves to sequentially fill the gas into the plurality of tanks and, after gas filling into the plurality of tanks, to allow communication between the separate gas filler passages, based on the heat dissipation information obtained by the heat dissipation information acquirer and the information in the tank obtained by the in-tank information acquirer.

[Aspect 10]

A gas filling method of filling a gas through separate gas filler passages to a plurality of tanks provided to store the gas, the gas filling method comprising:

(a) a heat dissipation information acquisition step of obtaining heat dissipation information regarding heat dissipation capacity of each of the plurality of tanks;

(b) a step of separately opening and closing each of valves provided in the respective gas filler passages, so as to control a gas flow supplied from the gas supplier;

(c) a step of obtaining information regarding at least one of temperature and pressure in each of the plurality of tanks; and (d) a step of opening and closing each of the valves to sequentially fill the gas into the plurality of tanks one by one, and then to allow communication between the separate gas filler passages after the plurality of tanks are filled with the gas, based on the heat dissipation information obtained by the heat dissipation information acquirer and the information in the tank obtained by the in-tank information acquirer.

[Aspect 11]

A moving device, comprising:

a plurality of tanks provided to store a gas supplied;

a plurality of sensors, each being configured to measure at least one of gas temperature and gas pressure in each of the plurality of tanks;

separate gas filler passages connected with the plurality of tanks;

valves provided in the separate gas filler passages; and a controller configured to separately open and close each of the valves, so as to sequentially fill the gas into the plurality of tanks one by one, and then to control a gas flow supplied from the gas supplier after the plurality of tanks are filled with the gas, wherein the controller comprises:

a heat dissipation information acquirer configured to obtain heat dissipation information regarding heat dissipation capacity of each of the plurality of tanks; and an in-tank information acquirer configured to obtain information regarding at least one of temperature and pressure in each of the plurality of tanks, and the controller causes opening and closing of the valves to sequentially fill the gas into the plurality of tanks one by one, and then to allow communication between the separate gas filler passages after the plurality of tanks are filled with the gas, based on the heat dissipation information obtained by the heat dissipation information acquirer and the information in the tank obtained by the in-tank information acquirer.

The moving device of this aspect allows communication between the plurality of tanks having different heat dissipation capacities during gas filling. Even when the temperature or the pressure increases in the tank of the lower heat dissipation capacity, this reduces the temperature increase or the pressure increase and ensures efficient gas filling.

[Aspect 12]

The moving device according to aspect 11, wherein the controller is configured to perform a gas filling process comprising the steps of:

(a) filling the gas into a first tank of higher heat dissipation capacity of the plurality of tanks, based on the heat dissipation information;

(b) stopping the gas filling into the first tank, and filling the gas into a second tank of lower heat dissipation capacity; and (c) stopping the gas filling into the second tank, while allowing communication between the first tank and the second tank.

[Aspect 13]

The moving device according to aspect 12, wherein the plurality of tanks are at least three tanks and include at least two first tanks, and the controller sequentially selects one of the at least two first tanks to fill the gas into the selected first tank in the step (a) in each cycle of the first filling process, and fills the gas into a remaining non-selected first tank and the second tank in the step (b).

The moving device of this aspect fills the gas first into the first tank, thus improving the gas filling efficiency, while switching the plurality of first tanks to be used, thus improving the durability of the first tanks.

[Aspect 14]

The moving device according to either one of aspects 12 and 13, wherein the second tank is lighter in weight than the first tank.

The moving device of this aspect improves the gas filling efficiency, while reducing the weight of the moving device.

The above aspects of the invention are not limited to the gas filling device but may be adopted in the other aspects, such as the gas filling system, the gas filing method and the moving device. The invention is not limited to the above aspects, but a multiplicity of variants and modifications may be made to these aspects without departing from the scope of the invention.

DETAILED DESCRIPTION

First Embodiment

Figure 1:
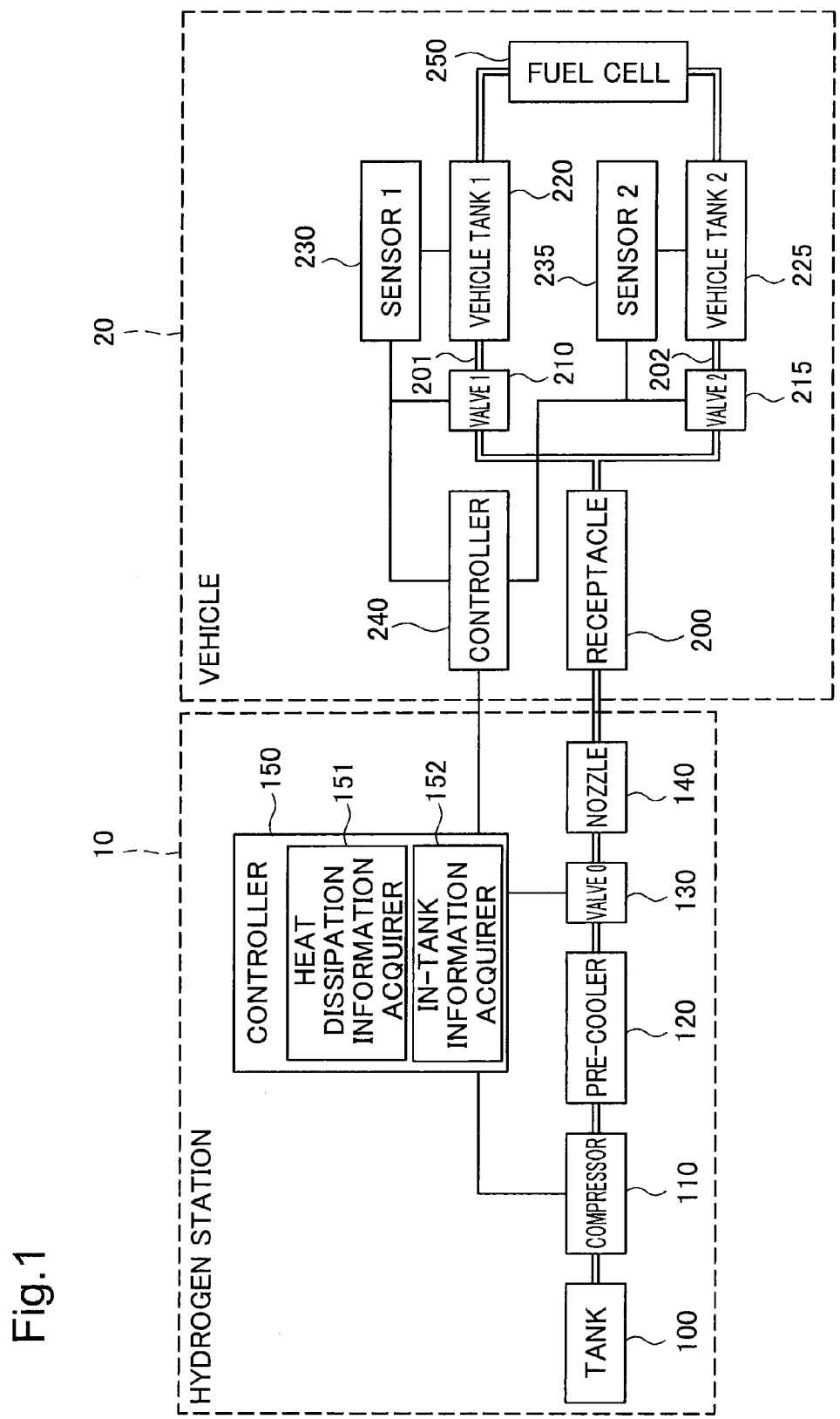
FIG. 1 illustrates the configuration of a hydrogen filling system.

FIG. 1 illustrates the configuration of a hydrogen filling system. The hydrogen filling system is configured to fill and supply hydrogen from a hydrogen station 10 to a vehicle 20. The hydrogen station 10 includes a tank 100, a compressor 110, a pre-cooler 120, an electrically-operated valve 130, a nozzle 140 and a controller 150. The vehicle 20 includes a receptacle 200, first and second electrically-operated valves 210 and 215, first and second vehicle tanks 220 and 225, first and second sensors 230 and 235, a controller 240 and a fuel cell 250.

The tank 100 stores hydrogen, which is to be supplied to the vehicle. The compressor 110 increases the hydrogen pressure to be higher than the gas pressures inside the vehicle tanks (described later), in order to fill hydrogen into the vehicle tanks. The compressor 110 is connected with the pre-cooler 120, which serves to lower the temperature of compressed hydrogen. The lowered temperature may be minus several tens degrees Celsius. The nozzle 140 is connected with the pre-cooler 120. The electrically-operated valve 130 is located between the pre-cooler 120 and the nozzle 140. The controller 150 is electrically connected with the compressor 110 and the electrically-operated valve 130 to control their operations. The controller 150 also includes a heat dissipation information acquirer 151 and an in-tank information acquirer 152. The heat dissipation information acquirer 151 obtains heat dissipation information of the first and second vehicle tanks 220 and 225. The in-tank information acquirer 152 obtains internal temperature and pressure data of the first and second vehicle tanks 220 and 225 from the first and second sensors 230 and 235.

The receptacle 200 serves as a joint with the nozzle 140 of the hydrogen station 10. The receptacle 200 is connected with the first and second vehicle tanks 220 and 225. The first and second vehicle tanks 220 and 225 store hydrogen as a fuel gas and supply hydrogen to the fuel cell 250. The first vehicle tank 220 has the higher heat dissipation capacity than the second vehicle tank 225. The heat dissipation capacity herein means the capability of releasing heat from inside of the vehicle tank to outside, and the high heat dissipation capacity indicates that the internal heat of the vehicle tank is readily releasable. This heat dissipation capacity depends on the material and the shape of the vehicle tank and the surrounding environment at the location of the vehicle tank. For example, the vehicle tank made of aluminum is expected to have the higher heat dissipation capacity than the vehicle tank made of resin. Similarly, the vehicle tank with radiation fins on the surface is expected to have the higher heat dissipation capacity than the vehicle tank without such radiation fins. Further, the vehicle tank located in the surrounding environment of good ventilation or in the surrounding environment with lower-temperature equipment than the temperature of the vehicle tank is expected to have the higher heat dissipation capacity than the vehicle tank located in the surrounding environment of poor ventilation or in the surrounding environment with higher-temperature equipment than the temperature of the vehicle tank.

The heat dissipation information showing which of the vehicle tanks has the higher heat dissipation capacity may be readily obtained, for example, by filling a gas into the two vehicle tanks to the same temperature level and subsequently monitoring the temperature changes or the pressure changes of the vehicle tanks 220 and 225 per unit time. The higher rate of temperature decrease indicates the higher heat dissipation capacity, and the higher rate of pressure decrease also indicates the higher heat dissipation capacity. In the gas equation PV=nRT, the volume "V" of the vehicle tank, the mole number "n" of the gas in the'vehicle tank, and the gas constant "R" are unchanged during heat dissipation, so that the pressure P of the gas in the vehicle tank is proportional to the temperature T of the gas in the vehicle tank. The higher rate of gas temperature decrease accordingly leads to the higher rate of gas pressure decrease. Which of the vehicle tanks has the higher heat dissipation capacity can thus be determined by comparison between the gas pressure changes in the vehicle tanks 220 and 225.

Also, the heat dissipation information may be obtained, based on the material, the shape and the installation location of the vehicle tank. According to another embodiment, the heat dissipation information may be calculated in advance with respect to each of the vehicle tanks and stored as data of the vehicle tank into an ECU (not shown) or the controller 240 of the vehicle 20. In this case, the heat dissipation information acquirer 151 may obtain the heat dissipation information from the ECU or the controller 240. According to another embodiment, such heat dissipation information with respect to each vehicle tank type may be stored in the controller 150 of the hydrogen station 10. The heat dissipation information acquirer 151 may obtain only data showing vehicle tank type from, for example, the ECU of the vehicle 20 and read the stored heat dissipation information at the time of gas filling.

Gas filler passages 201 and 202 connect the receptacle 200 with the first and second vehicle tanks 220 and 225. The first and second electrically-operated valves 210 and 215 are provided respectively on the gas filler passages 201 and 202. The first and second sensors 230 and 235 are also connected with the first and second vehicle tanks 220 and 225. The first and sensor sensors 230 and 235 respectively obtain either one or both of the internal gas temperature and pressure in the first and second vehicle tanks 220 and 225. The controller 240 is electrically connected with the first and second sensors 230 and 235 to obtain the internal gas temperature and pressure in the first and second vehicle tanks 220 and 225. The controller 240 is also connected with the first and second electrically-operated valves 210 and 215 to control opening/closing of the first and second electrically-operated valves 210 and 215 and control the hydrogen filling, based on the internal gas temperature and pressure in the first and second vehicle tanks 220 and 225. The concrete procedure of control will be described later. The controller 240 is also electrically connected with the controller 150 of the hydrogen station 10 and cooperates with the controller 150 to control the hydrogen filling from the hydrogen station 10 into the vehicle 20. In this case, the controller 240 of the vehicle 20 may receive a signal (control signal) from the controller 150 of the hydrogen station 10 and control opening/closing of the first and second electrically-operated valves 210 and 215. The electrical connection between the controller 150 and the controller 240 may be achieved, for example, by wired connection, infrared connection or wireless connection. The fuel cell 250 is connected with the first and second vehicle tanks 220 and 225 and receives the hydrogen supply from the first and second vehicle tanks 220 and 225 to generate electric power, which is used as the driving force of the vehicle 20.

Figure 2:
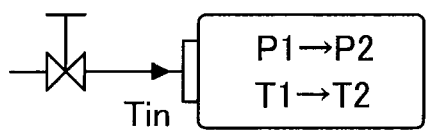
FIG. 2 illustrates a hydrogen filling model to a tank.

FIG. 2 illustrates a hydrogen filling model to a tank. The gas temperature T2 in the tank after gas filling is expressed by Equation (1) given below (Kazuyasu MATSUO "Compressible Hydrodynamics", Nov. 10, 1994, Rikogakusha Publishing Co., Ltd):

[Equation 1]

$$T_2 = \frac{Y * P_2 * T_1 * T_{in}}{(P_2 - P_1) * T_1 + Y * P_1 * T_{in}} \quad (1)$$

Wherein P1, T1, Tin and P2 respectively represent the initial gas pressure in the tank, the initial gas temperature in the tank, the temperature of externally supplied gas, and the gas pressure in the tank after gas filling; γ represents the specific heat ratio and γ=1.41 for hydrogen.

When P2>>P1, T2=γ·Tin according to Equation (1) given above. In an application of this model to the embodiment, Tin denotes the temperature of hydrogen to be filled into the first or second vehicle tank 220 or 225. In order to prevent the gas temperature T2 in the first or second vehicle tank 220 or 225 after hydrogen filling from reaching the maximum working temperature of the first or second vehicle tank 220 or 225, for example, 85° C. (358.15K), Tin should meet the relationship of Tin<−20° C. (253.15K). It is thus preferable to lower the hydrogen temperature to or below −20° C. by the pre-cooler 120.

Figure 3:
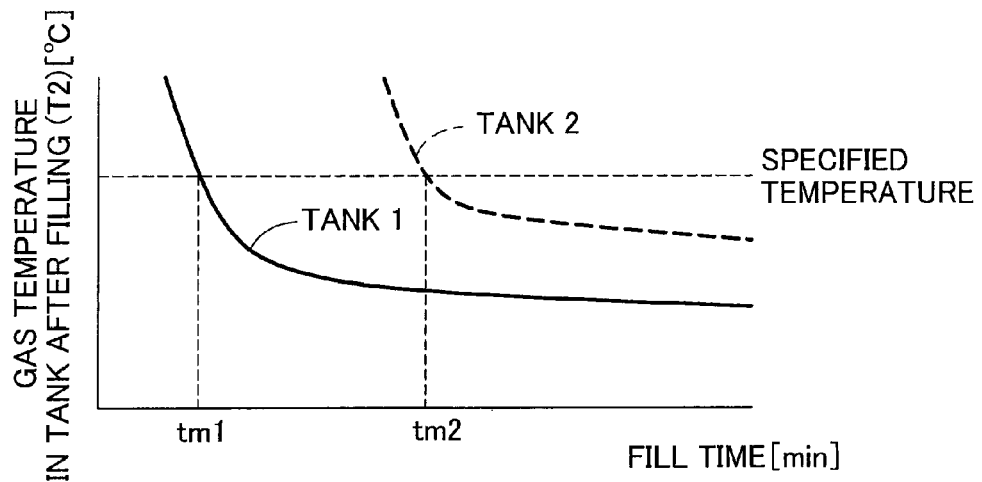
FIG. 3 shows variations in hydrogen temperature in the tank after hydrogen filling against the fill time.

FIG. 3 shows variations in hydrogen temperature in the tank after hydrogen filling against the fill time. The abscissa of the graph shows the time required for filling hydrogen to a specified pressure level in the first or second vehicle tank 220 or 225 (filling completion time). In general, the longer fill time tends to lower the gas temperature T2 in the tank after gas filling. For example, with respect to the first vehicle tank 220, hydrogen filling in a time period tm1 causes the hydrogen temperature in the first vehicle tank 220 to just reach a specified temperature level (for example, maximum working temperature of 85° C.). The lower rate of hydrogen filling causes the hydrogen temperature in the first vehicle tank 220 to be lower than the specified temperature level. With respect to the second vehicle tank 225, however, hydrogen filling in a time period tm2 or a longer time period causes the hydrogen temperature in the second vehicle tank 225 to be lower than the specified temperature level. This difference in time may be attributed to the higher heat dissipation capacity and the resulting easier heat release to the outside air of the first vehicle tank 220 than the second vehicle tank 225.

Figure 4:
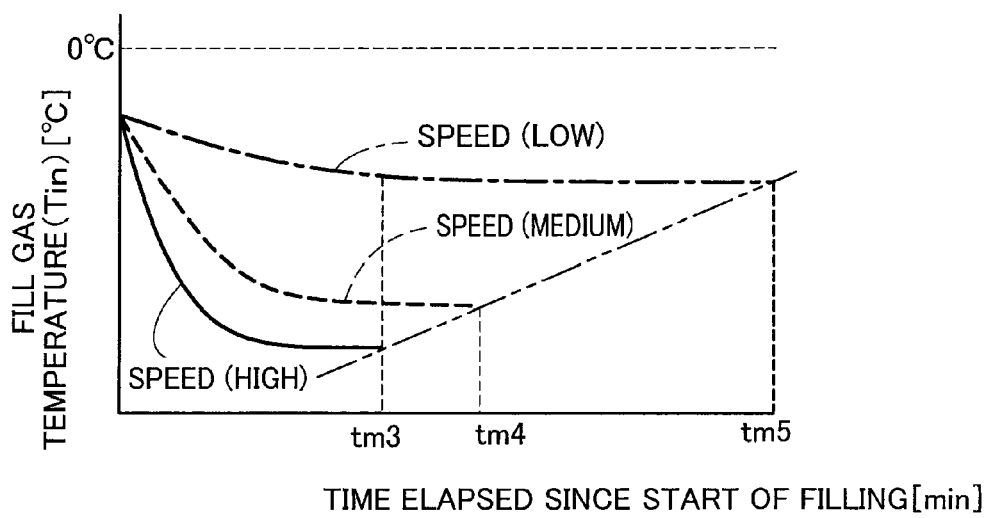
FIG. 4 shows variations in hydrogen temperature to be filled into the tank against the time elapsed since start of filling.

FIG. 4 shows variations in hydrogen temperature to be filled into the tank against the time elapsed since start of filling. The abscissa of the graph shows the time elapsed since the start of filling. In general, the higher filling rate (shorter filling completion time) causes the piping system including the electrically-operated valve 130 and the nozzle 140 to be cooled more quickly and thereby lowers the fill gas temperature Tin at the higher rate. For example, the higher fill rate gives the lower fill gas temperature Tin at an elapsed time tm3. The lower fill rate gives the higher fill gas temperature after gas filling, since hydrogen flowing through the pathway from the pre-cooler 120 to the nozzle 140 is warmed by the ambient temperature.

Figure 5:
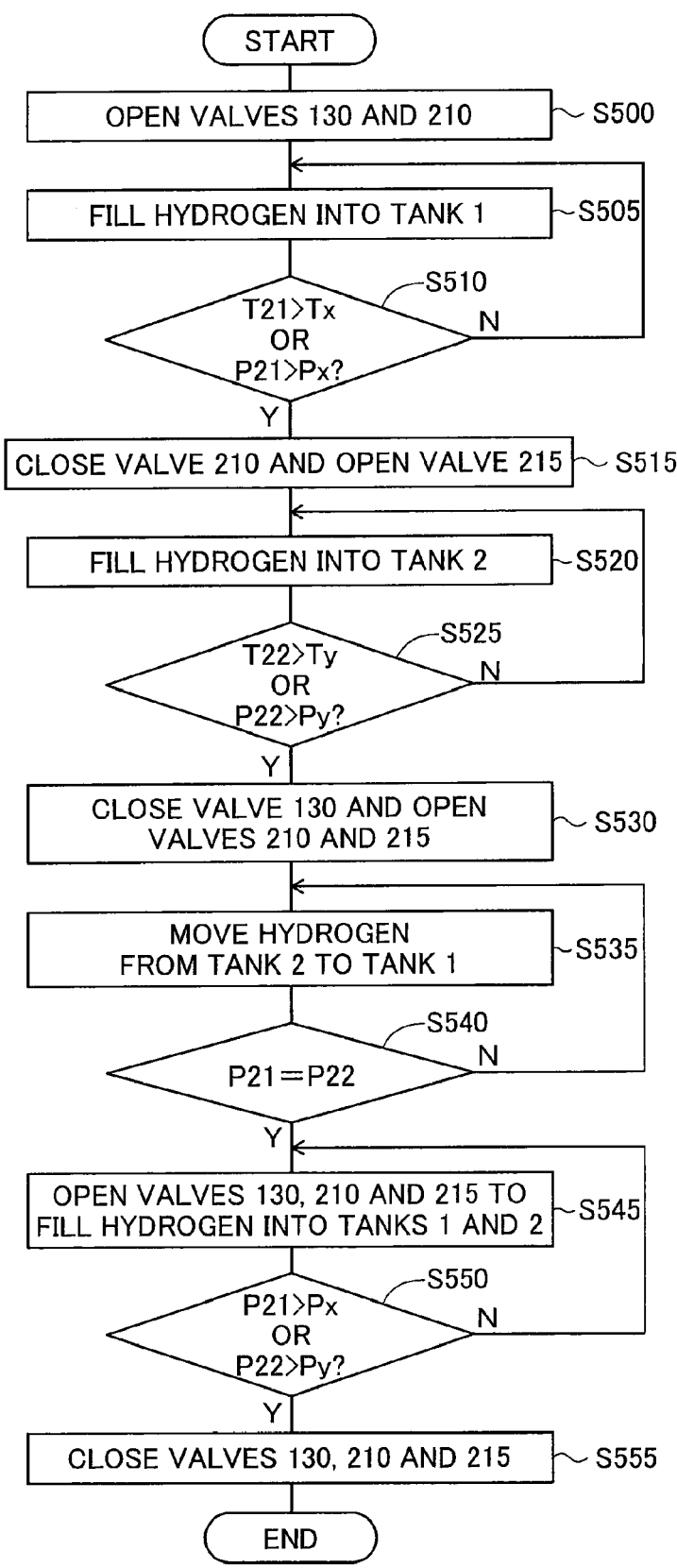
FIG. 5 is a flowchart showing a procedure of hydrogen filling process.

FIG. 5 is a flowchart showing a procedure of hydrogen filling process. The hydrogen filling process is triggered by connecting the receptacle 200 of the vehicle 20 to the nozzle 140 of the hydrogen station 10. At this moment, the controller 150 of the hydrogen station 10 is electrically connected with the controller 240 of the vehicle 20.

At step S500, the controller 150 opens the electrically-operated valve 130 of the hydrogen station 10, and the controller 240 opens the first electrically-operated valve 210 while keeping the second electrically-operated valve 215 closed. At step S505, the hydrogen in the tank 100 is pressurized to be higher than the pressure level of hydrogen in the first vehicle tank 220 by the compressor 110. The pressure of hydrogen is expected to decrease during subsequent cooling with the pre-cooler 120 (as the pressure is proportional to the temperature under the condition of the fixed volume and the fixed mole number according to the gas equation). Preferably, the controller 150 should thus pressurize the hydrogen by taking into account this subsequent pressure decrease. The hydrogen is then cooled by the pre-cooler 120, flows through the nozzle 140 and the receptacle 200 and is filled into the first vehicle tank 220.

At step S510, the controller 240 obtains hydrogen pressure P21 and temperature T21 in the first vehicle tank 220 from the first sensor 230, for example, at fixed time intervals. In the symbol "Pnm" for the pressure, "P" represents the pressure. The subscript "n" shows differentiation between before and after gas filling; n=1 indicates before gas filling and n=2 indicate after gas filling. The subscript "m" shows differentiation between the vehicle tanks; m=1 indicates the first vehicle tank and m=2 indicates the second vehicle tank. The symbol P21 accordingly shows the gas pressure in the first vehicle tank 220 after gas filling. In the symbol "Tnm" for the temperature, "T" represents the temperature and the subscripts "n" and "m" have the same meaning as those for the pressure. When either the hydrogen pressure P21 or the hydrogen temperature T21 in the first vehicle tank 220 exceeds a preset reference value Px or Tx, the processing flow proceeds to step S515.

At step S515, the controller 240 closes the first electrically-operated valve 210 and opens the second electrically-operated valve 215. The procedure then fills hydrogen into the second vehicle tank 225 at step S520, while stopping the hydrogen filling into the first vehicle tank 220.

At step S525, the controller 240 obtains hydrogen pressure P22 and temperature T22 in the second vehicle tank 225 from the second sensor 235, for example, at fixed time intervals. When either the hydrogen pressure P22 or the hydrogen temperature T22 in the second vehicle tank 225 exceeds a preset reference value Py or Ty, the processing flow proceeds to step S530. The reference values Py and Ty used at step S525 may be equal to the reference values Px and Tx used at step S510. The first and second vehicle tanks 220 and 225 are made of different materials, so that the reference values may be determined according to the properties, such as pressure resistances and upper temperature limits, of the respective vehicle tanks 220 and 225.

At step S530, the controller 240 sends an instruction to the controller 150 to close the electrically-operated valve 130 of the hydrogen station 10. The controller 240 then opens the first and second electrically-operated valves 210 and 215 to allow communication between the first vehicle tank 220 and the second vehicle tank 225. At subsequent step S535, hydrogen moves from the vehicle tank of the higher pressure to the vehicle tank of the lower pressure. When the reference pressure Px at step S510 is equal to the reference pressure Py at step S525, the hydrogen pressure in the first vehicle tank 220 is lower than the hydrogen pressure in the second vehicle tank 225, due to the earlier stop of the hydrogen filling into the first vehicle tank 220 and the higher heat dissipation capacity of the first vehicle tank 220. Hydrogen is accordingly moved from the second vehicle tank 225 to the first vehicle tank 220.

At step S540, the controller 240 obtains the hydrogen pressures P21 and P22 in the first and second vehicle tanks 220 and 225 from the first and second sensors 230 and 235. When the pressures P21 and P22 are equal to each other, these pressures (P21=P22) are supposed to be lower than the reference pressure Px at step S510 or the reference pressure Py at step S525. This indicates that further hydrogen filling to the reference pressure Px or to the reference pressure Py is allowable. For further hydrogen filling, the controller 240 shifts the processing to step S545.

At step S545, the controller 240 sends an instruction to the controller 150 to open the electrically-operated valve 130 of the hydrogen station 10. This valve opening allows further hydrogen filling into the first and second vehicle tanks 220 and 225. At step S550, the controller 240 obtains the hydrogen pressures P21 and P22 in the first and second vehicle tanks 220 and 225 from the first and second sensors 230 and 235 and determines whether the hydrogen pressure P21 or P22 in the first or second vehicle tank exceeds the reference pressure Px or Py. When the hydrogen pressure P21 or P22 exceeds the reference pressure Px or Py, the controller 240 closes the first and second electrically-operated valves 210 and 215, while sending an instruction to the controller 150 to close the electrically-operated valve 130 of the hydrogen station 10 at step S555.

Figure 6:
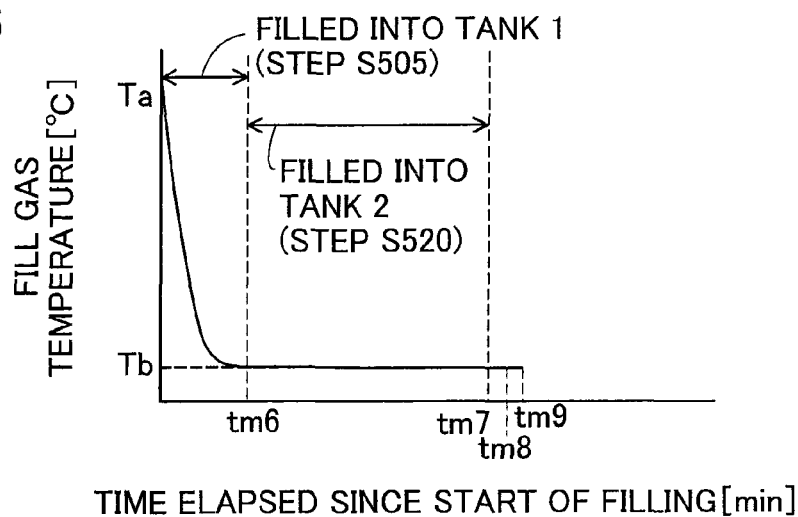
FIG. 6 shows which of the tanks is filled with hydrogen, in relation to the fill time and the fill hydrogen temperature.

FIG. 6 shows which of the tanks is filled with hydrogen, in relation to the fill time and the fill hydrogen temperature. FIG. 6 corresponds to the graph of FIG. 4. The shorter elapsed time since the start of filling causes the relatively high fill hydrogen temperature Tin. The hydrogen should thus be filled first into the first vehicle tank 220 having the higher thermal conductivity and the higher heat dissipation capacity. After the fill hydrogen temperature Tin is lowered, the hydrogen is filled into the second vehicle tank 225, because of the reason described below.

The hydrogen temperature T2 in the tank after hydrogen filling is given by $\gamma*Tin$ (Equation (1)) as explained above. As shown in FIG. 6, the fill gas temperature Tin decreases over time.

(1) Filling hydrogen first into first vehicle tank and then into second vehicle tank:

In this case, hydrogen is filled first into the first vehicle tank 220 at the high fill gas temperature Tin (Tin=Ta). The hydrogen temperature in the first vehicle tank 220 after hydrogen filling is accordingly given by $T21a=\gamma \cdot Ta$. The subscript "x" of the symbol "Tnmx" shows which of the vehicle tanks is filled first with hydrogen; x=a indicates that hydrogen is filled first into the first vehicle tank 220 and x=b indicates that hydrogen is filled first into the second vehicle tank 225. Hydrogen is then filled into the second vehicle tank 225. When the fill gas temperature Tin is temperature Tb (Tb<Ta), the hydrogen temperature in the second vehicle tank 225 after hydrogen filling is given by $T22a=\gamma \cdot Tb$. Temperature $T31a$ of the first vehicle tank 220 after hydrogen filling into the second vehicle tank 225 is lower than $\gamma \cdot Ta$. The subscript "3" means immediately after hydrogen filling into the other vehicle tank (second vehicle tank 225 in this case). The temperature of the first vehicle tank 220 is lowered by heat dissipation from the first vehicle tank 220 during hydrogen filling into the second vehicle tank 225.

(2) Filling hydrogen first into second vehicle tank and then into first vehicle tank:

In this case, hydrogen is filled first into the second vehicle tank 225 at the high fill gas temperature Tin (Tin=Ta). The hydrogen temperature in the second vehicle tank 225 after hydrogen filling is accordingly given by $T22b=\gamma \cdot Ta$. Hydrogen is then filled into the first vehicle tank 220. When the fill gas temperature Tin is temperature Tb (Tb<Ta), the hydrogen temperature in the first vehicle tank 220 after hydrogen filling is given by T21$b$=γ·Tb. Temperature T32$b$ of the second vehicle tank 225 after hydrogen filling into the first vehicle tank 220 is lower than γ·Tb. The subscript "3" means immediately after hydrogen filling into the other vehicle tank (first vehicle tank 220 in this case).

The comparison between the temperatures T31$a$ and T32$b$ of the first hydrogen-filled vehicle tanks immediately after hydrogen filling into the other vehicle tank gives the relation of T31$a$<T32$b$. This depends on the heat dissipation from the first gas-filled vehicle tank during gas filling into the other vehicle tank. The first vehicle tank 220 has the higher thermal conductivity and the higher heat dissipation capacity than the second vehicle tank 225, so that a greater amount of heat is released from the first vehicle tank 220. This results in lowering the temperature of the first vehicle tank 220. The comparison between the temperatures of the later hydrogen-filled vehicle tanks 220 and 225, on the other hand, indicates the equal temperatures (as given by T22$a$=T21$b$=γ·Tb).

Since T21$a$=T22$b$=γ·Ta, according to the gas equation, the first hydrogen-filled vehicle tanks 220 and 225 after hydrogen filling have the same mole number of hydrogen, as long as the first and second vehicle tanks have the same inner volume. This mole number is shown as n1 moles. Since T22$a$=T21$b$=γ·Tb, the later hydrogen-filled vehicle tanks have the same mole number of hydrogen after hydrogen filling. This mole number is shown as n2 moles.

The gas temperatures in the vehicle tanks after the communication between the first vehicle tank 220 and the second vehicle tank 225 (after step S540 in FIG. 5) are then compared. According to the law of conservation of heat, hydrogen temperature T4$a$ in the first hydrogen-filled first vehicle tank 220 after hydrogen filling is given as T4$a$=(n1·T31$a$+n2·T22$a$)/(n1+n2), whilst hydrogen temperature T4$b$ in the first hydrogen-filled second vehicle tank 225 after hydrogen filling is given as T4$b$=(n2·T21$b$+n1·T32$b$)/(n1+n2). Since T22$a$=T21$b$ cancels out n2·T22$a$ and n2·T21$b$ each other, Ta−Tb=n1·(T31$a$−T32$b$)/(n1+n2). Since T31$a$<T32$b$ as given above, Ta−Tb<0. Filling hydrogen first into the first vehicle tank 220 and then into the second vehicle tank 225 accordingly lowers the hydrogen temperature in the vehicle tank, compared with filling hydrogen first into the second vehicle tank 225 and then into the first vehicle tank 220.

Figure 7:
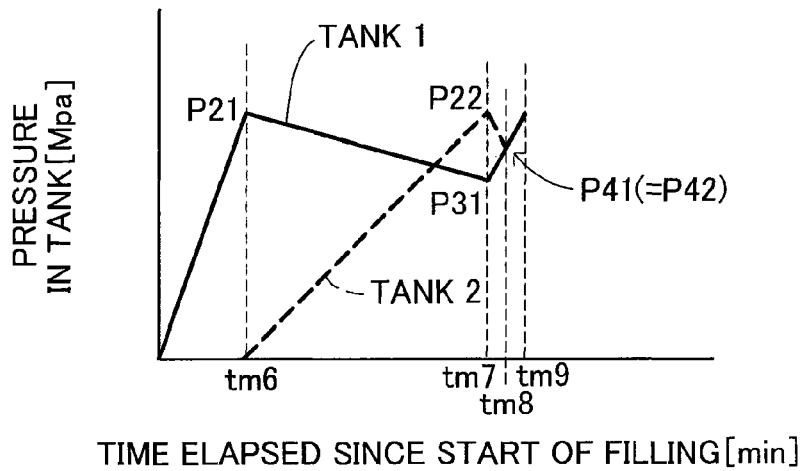
FIG. 7 shows variations in hydrogen pressure against the elapsed time with respect to the respective tanks.
Figure 8:
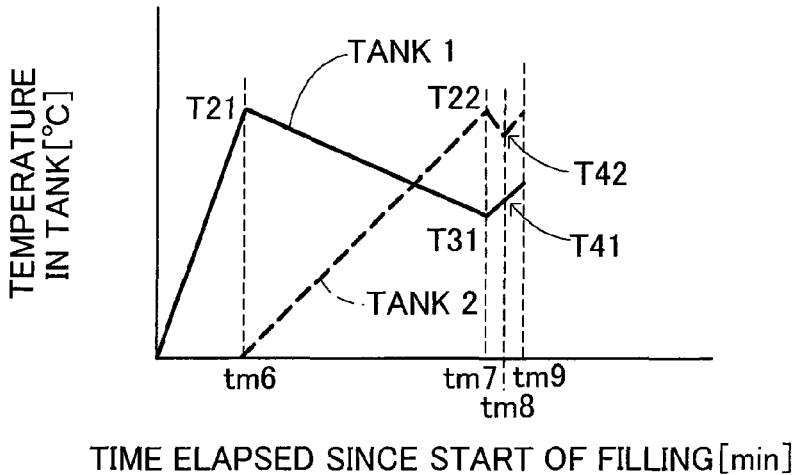
FIG. 8 shows variations in hydrogen temperature against the elapsed time with respect to the respective tanks.

FIG. 7 shows variations in hydrogen pressure against the elapsed time with respect to the respective tanks. FIG. 8 shows variations in hydrogen temperature against the elapsed time with respect to the respective tanks. Hydrogen is filled into the first vehicle tank 220 until time tm6 (step S505 in FIG. 5) and is filled into the second vehicle tank 225 from the time tm6 to time tm7 (step S520). The first vehicle tank 220 and the second vehicle tank 225 communicate with each other from the time tm7 to time tm8 (step S535). Hydrogen is filled into both the first vehicle tank 220 and the second vehicle tank 225 from the time tm8 to time tm9 (step S545).

As hydrogen is filled into the first vehicle tank 220 until the time tm6, the hydrogen pressure and temperature in the first vehicle tank 220 respectively increase to the pressure P21 and to the temperature T21. As hydrogen is filled into the second vehicle tank 225 from the time tm6 to the time tm7, the hydrogen pressure and temperature in the second vehicle tank 225 respectively increase to the pressure P22 and to the temperature T22, while the hydrogen pressure and temperature in the first vehicle tank 220 are respectively lowered by heat dissipation to pressure P31 and to temperature T31.

As hydrogen moves from the second vehicle tank 225 of the higher pressure level to the first vehicle tank 220 of the lower pressure level from the time tm7 to the time tm8, the hydrogen pressure increases in the first vehicle tank 220 while decreasing in the second vehicle tank 225. At the time tm8, hydrogen pressure P41 in the first vehicle tank 220 is in equilibrium with hydrogen pressure P42 in the second vehicle tank 225 (P41=P42). Similarly the hydrogen temperature increases in the first vehicle tank 220 while decreasing in the second vehicle tank 225, and eventually reaches the equilibrium state (T41=T42). The temperature gradually reaches the equilibrium state by diffusion and accordingly takes more time to the equilibrium state than the pressure.

As hydrogen is filled into both the first vehicle tank 220 and the second vehicle tank 225 from the time tm8 to the time tm9, the hydrogen temperature and pressure in both the first and second vehicle tanks 220 and 225 increase.

Figure 9:
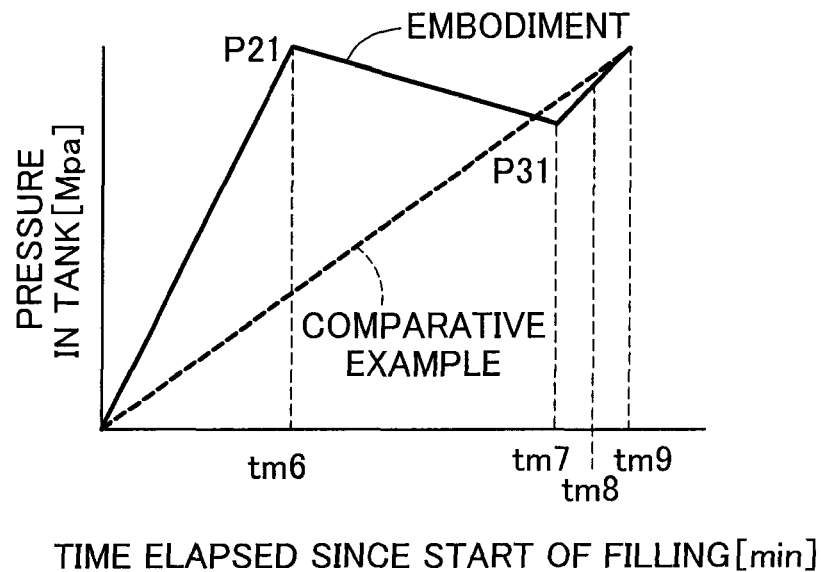
FIG. 9 shows variations in hydrogen pressure in the first vehicle tank 220 against the elapsed time with respect to an embodiment and a comparative example.
Figure 10:
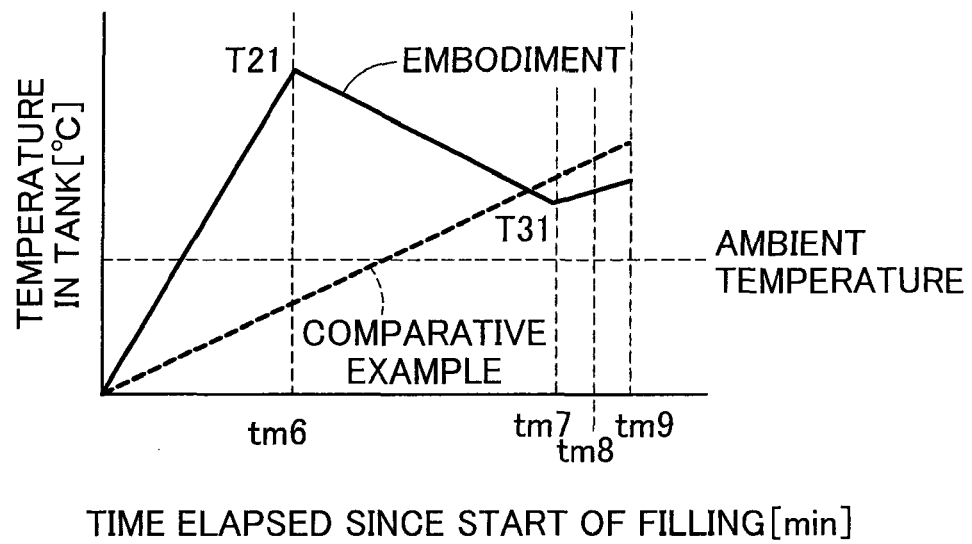
FIG. 10 shows variations in hydrogen temperature in the first vehicle tank 220 against the elapsed time with respect to the embodiment and the comparative example.

FIG. 9 shows variations in hydrogen pressure in the first vehicle tank 220 against the elapsed time with respect to an embodiment and a comparative example. FIG. 10 shows variations in hydrogen temperature in the first vehicle tank 220 against the elapsed time with respect to the embodiment and the comparative example. The comparative example fills hydrogen at a fixed fill rate to reach the same pressure level as that of the embodiment at the time tm9. In the embodiment, on the other hand, both the hydrogen pressure and the hydrogen temperature in the first vehicle tank 220 abruptly increase until the time tm6 and then decrease in the time period between the time tm6 and the time tm7 as described above with reference to FIGS. 7 and 8.

In the time period between the time tm7 and the time tm8, hydrogen moves from the second vehicle tank 225 of the higher pressure and the higher temperature to the first vehicle tank 220 of the lower pressure and the lower temperature. The hydrogen pressure and the hydrogen temperature in the first vehicle tank 220 accordingly increase in the time period between the time tm7 and the time tm8. Hydrogen is filled again into both the first vehicle tank 220 and the second vehicle tank 225 in the time period between the time tm8 and the time tm9, which further increases the hydrogen pressure and the hydrogen temperature in the first vehicle tank 220.

The hydrogen temperature in the first vehicle tank 220 of the embodiment measured at the time tm9 is lower than the hydrogen temperature in the first vehicle tank 220 of the comparative example. The lower hydrogen temperature in the first vehicle tank 220 of the embodiment at the time tm9 than the hydrogen temperature in the first vehicle tank 220 of the comparative example results from that the embodiment has the longer time period when the hydrogen temperature in the first vehicle tank 220 is higher than the ambient temperature than the comparative example. This results in the longer heat dissipation time and thereby causes the lower hydrogen temperature in the first vehicle tank 220 of the embodiment than that of the comparative example.

According to the gas equation, under the condition of the fixed hydrogen pressure in the first vehicle tank 220 and the fixed volume of the first vehicle tank 220, the mole number of hydrogen in the first vehicle tank 220 is inversely proportional to the hydrogen temperature in the first vehicle tank 220. This means that a greater amount of hydrogen is filled into the first vehicle tank 220 of the embodiment than that of the comparative example. In other words, the embodiment has the shorter fill time to fill the same amount of hydrogen than the comparative example.

As described above, according to the embodiment, during hydrogen filling, the second tank of the lower heat dissipation capacity has the higher temperature and the higher pressure. Communication between the first tank of the higher heat dissipation capacity and the second tank of the lower heat dissipation capacity reduces such temperature difference and pressure difference to ensure the efficient gas filling.

The procedure of this embodiment fills hydrogen first into the first vehicle tank 220 of the higher heat dissipation capacity and then into the second vehicle tank 225 of the lower heat dissipation capacity and subsequently allows communication between the first vehicle tank 220 and the second vehicle tank 225. This enables the efficient gas filling into the first and the second vehicle tanks 220 and 225. The communication between the first vehicle tank 220 and the second vehicle tank 225 lowers the temperature of the second vehicle tank 225 and thereby improves the durability of the second vehicle tank. Subsequent hydrogen filling into both the first and the second vehicle tanks further increases the total amount of hydrogen filling.

Second Embodiment

A second embodiment has the same device structure as that of the first embodiment but adopts a different method of gas filling from that of the first embodiment. The difference from the first embodiment is that the second embodiment allows switching between the gas filling method (a) of filling hydrogen first into the first vehicle tank 220 and then into the second vehicle tank 225 and subsequently allowing communication between the first vehicle tank 220 and the second vehicle tank 225 described in the first embodiment and another gas filling method (b) of simultaneously filling hydrogen into the first and the second vehicle tanks 220 and 225. The controller 240 makes switching, based on the hydrogen pressure and the hydrogen temperature in the first or second vehicle tank before hydrogen filling.

Figure 11:
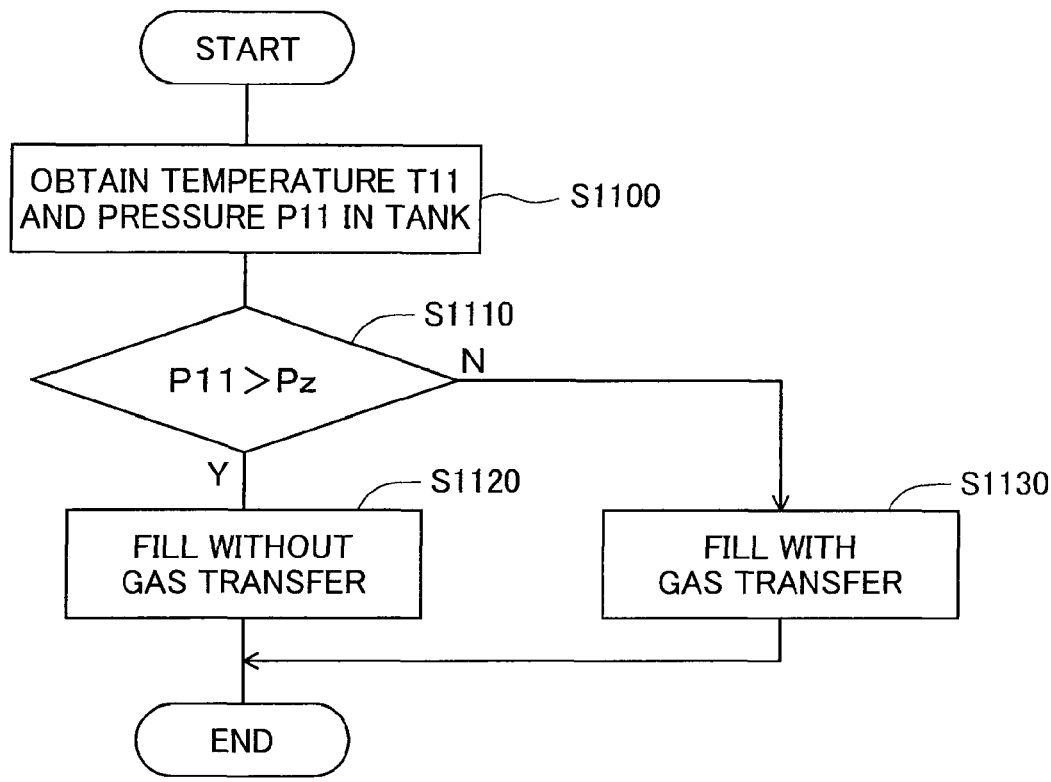
FIG. 11 is a flowchart showing a control switching procedure according to the second embodiment.

FIG. 11 is a flowchart showing a control switching procedure according to the second embodiment. At step S1100, the controller 240 obtains the hydrogen pressures and the hydrogen temperatures in the first and the second vehicle tanks 220 and 225 from the first and the second sensors 230 and 235. Prior to hydrogen filling, hydrogen temperatures T11 and T12 in the first vehicle tank 220 and in the second vehicle tank 225 are substantially equal to the ambient temperature. Hydrogen pressures P11 and P12 in the first vehicle tank 220 and in the second vehicle tank 225 are substantially equal to each other. At step S1110, the controller 240 determines whether the obtained hydrogen pressure P11 is greater than a reference value Pz. When the obtained hydrogen pressure P11 is greater than the reference value Pz, the controller 240 shifts the processing to step S1120 to simultaneously fill hydrogen into both the first and the second vehicle tanks 220 and 225 (gas filling method (b)). When the obtained hydrogen pressure P11 is not greater than the reference value Pz, on the other hand, the controller 240 shifts the processing to step S1130 to fill hydrogen into the first and the second vehicle tanks 220 and 225 according to the method of the first embodiment (gas filling method (a)).

The obtained pressure P11 that is greater than the reference value Pz indicates that a relatively large amount of hydrogen remains in the first and the second vehicle tanks 220 and 225 before hydrogen filling. In this state, hydrogen filling does not satisfy the relation of P2>>P1 (P1=P11) in Equation (1) described above in the first embodiment and accordingly does not give the high hydrogen temperature T21 in the first vehicle tank 220 after hydrogen filling. Hydrogen filling into the second vehicle tank 225 also does not give the high hydrogen temperature T22 in the second vehicle tank 225 after hydrogen filling. In this case, filling hydrogen simultaneously into the first and the second vehicle tanks 220 and 225 shortens the fill time, compared with filling hydrogen according to the method of the first embodiment.

The obtained pressure P11 that is not greater than the reference value Pz, on the other hand, satisfies the relation of P2>>P1 (P1=P11) and gives the high temperatures T21 and T22 according to Equation (1) described above in the first embodiment. This causes the greater heat dissipation effect from the first vehicle tank 220. In this case, filling hydrogen according to the method of the first embodiment shortens the fill time.

Figure 12:
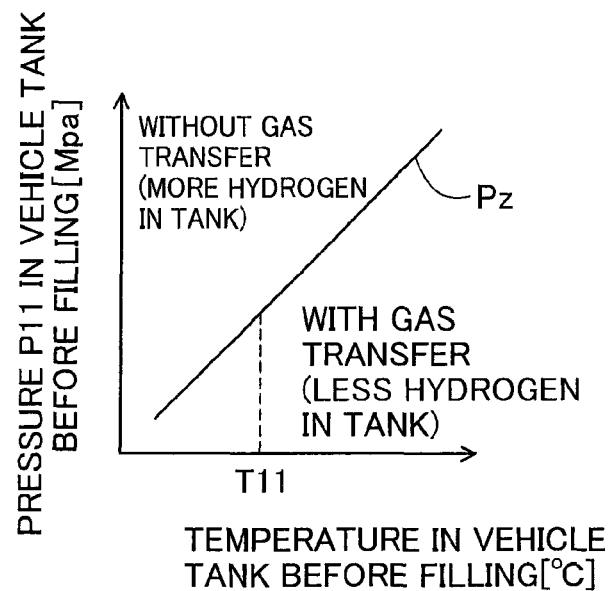
FIG. 12 shows a control switching map according to the second embodiment.

FIG. 12 shows a control switching map according to the second embodiment. The controller 240 may use such a map to determine whether the hydrogen pressure P11 is greater than the reference value Pz.

Modifications:

The system includes one first vehicle tank 220 and one second vehicle tank 225 according to the first embodiment but may include a plurality of first vehicle tanks and/or a plurality of second vehicle tanks. For example, hydrogen is filled first into one of a plurality of first vehicle tanks 220 (first vehicle tank 220a) at step S505 in FIG. 5 and then into the other first vehicle tank 220b and the second vehicle tank 225 at step S520. In the next cycle of hydrogen filling after hydrogen consumption, hydrogen is filled first into the first vehicle tank 220b at step S505 in FIG. 5 and then into the other first vehicle tank 220a and the second vehicle tank 225 at step S520. Alternately repeating these hydrogen filling cycles improves the durability of the first vehicle tanks.

The materials of the first and the second vehicle tanks are not specifically mentioned in the above embodiments. The first vehicle tank may be made of metal material, such as aluminum, while the second vehicle tank 225 may be made of resin material. Using the metal material, such as aluminum, for both the first and the second vehicle tanks 220 and 225 ensures the high heat dissipation capacities but undesirably increases the total weight. Using the resin material for both the first and the second vehicle tanks 220 and 225, on the other hand, makes weight reduction but undesirably gives the low heat dissipation capacities, which results in the longer gas fill time. Using the metal material, such as aluminum, for the first vehicle tank 220 and the resin material for the second vehicle tank 225 as described in this modification improves the gas filling efficiency, while making weight reduction to some extent.

The above embodiment describes the application of the invention to the fuel cell vehicle using hydrogen, but the invention may also be applicable to diversity of other aspects; for example, various moving bodies using gas, such as natural gas vehicle or ship using combustion of natural gas. The invention is not limited to the gas-using application but may also be applicable to fill a gas into a tank for gas transportation. The processing of steps S545 to S550 in FIG. 5 may be omitted.

In the system of the embodiment described above, the controller 240 of the vehicle 20 cooperates with the controller 150 of the hydrogen station 10 to control the hydrogen filling. One of the controllers 150 and 240 may be omitted. In this application, the remaining controller 150 or 240 has the heat dissipation information acquirer and the in-tank information acquirer to control the hydrogen filling.

Figure 13:
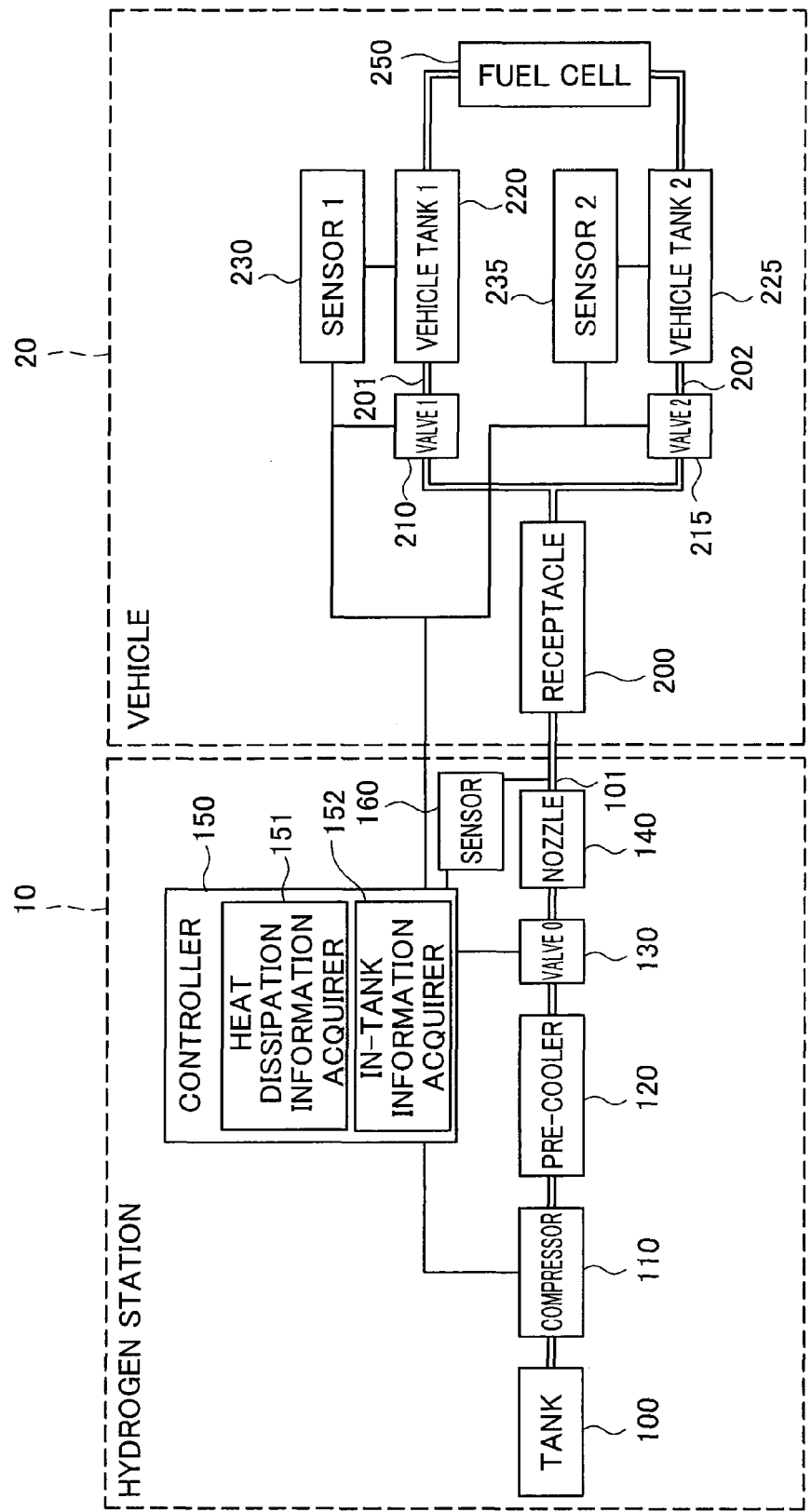
FIG. 13 illustrates a system configuration in which the controller 150 of the hydrogen station 10 controls the hydrogen filling.

FIG. 13 illustrates a system configuration in which the controller 150 of the hydrogen station 10 controls the hydrogen filling. When the controller 150 of the hydrogen station 10 controls the hydrogen filling, the hydrogen station 10 may have a pressure sensor 160 placed in a gas filler passage 101. The controller 150 may obtain the hydrogen pressures in the first and the second vehicle tanks 220 and 225 from the pressure sensor 160 provided in the gas filler passage 101, instead of obtaining the pressure data from the sensors 230 and 235 of the vehicle. The controller 150 may control filling hydrogen into the respective vehicle tanks 220 and 225, based on the obtained hydrogen pressures.

Figure 14:
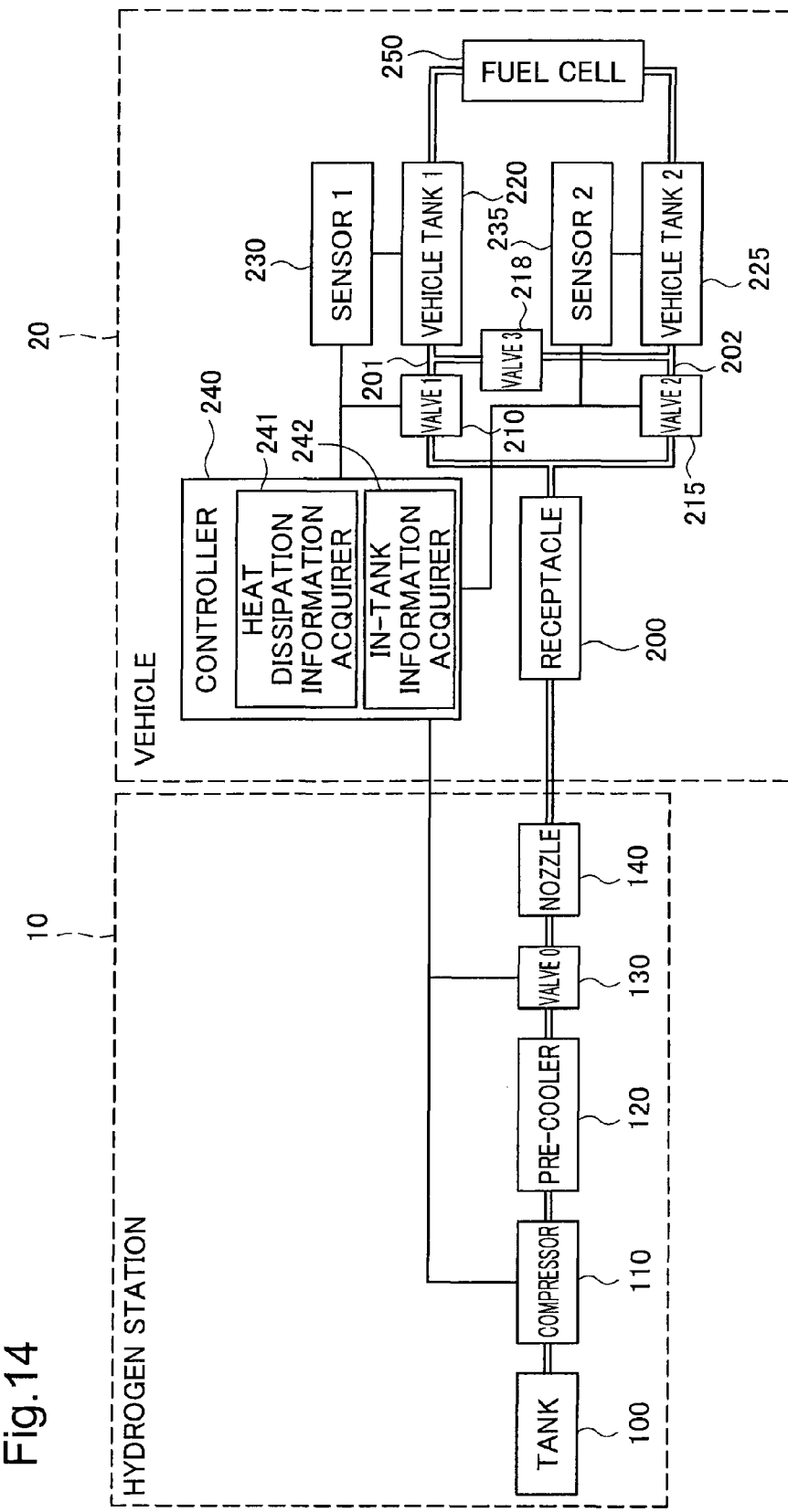
FIG. 14 illustrates a system configuration in which the controller 240 of the vehicle 20 controls the hydrogen filling.

FIG. 14 illustrates a system configuration in which the controller 240 of the vehicle 20 controls the hydrogen filling. The controller 240 includes a heat dissipation information acquirer 241 and an in-tank information acquirer 242. The vehicle 10 may have a communication valve 218 to allow communication between the gas filler passages 201 and 202. The communication valve 218 may be connected between the first vehicle tank 220 and a first electrically-operated valve 210 on the gas filler passage 201 and between the second vehicle tank 225 and a second electrically-operated valve 215 on the gas filler passage 202. This arrangement allows the direct communication between the first vehicle tank 220 and the second vehicle tank 225 without the hydrogen station 10 in the closed positions of the first and the second electrically-operated valves 210 and 215.

Figure 15:
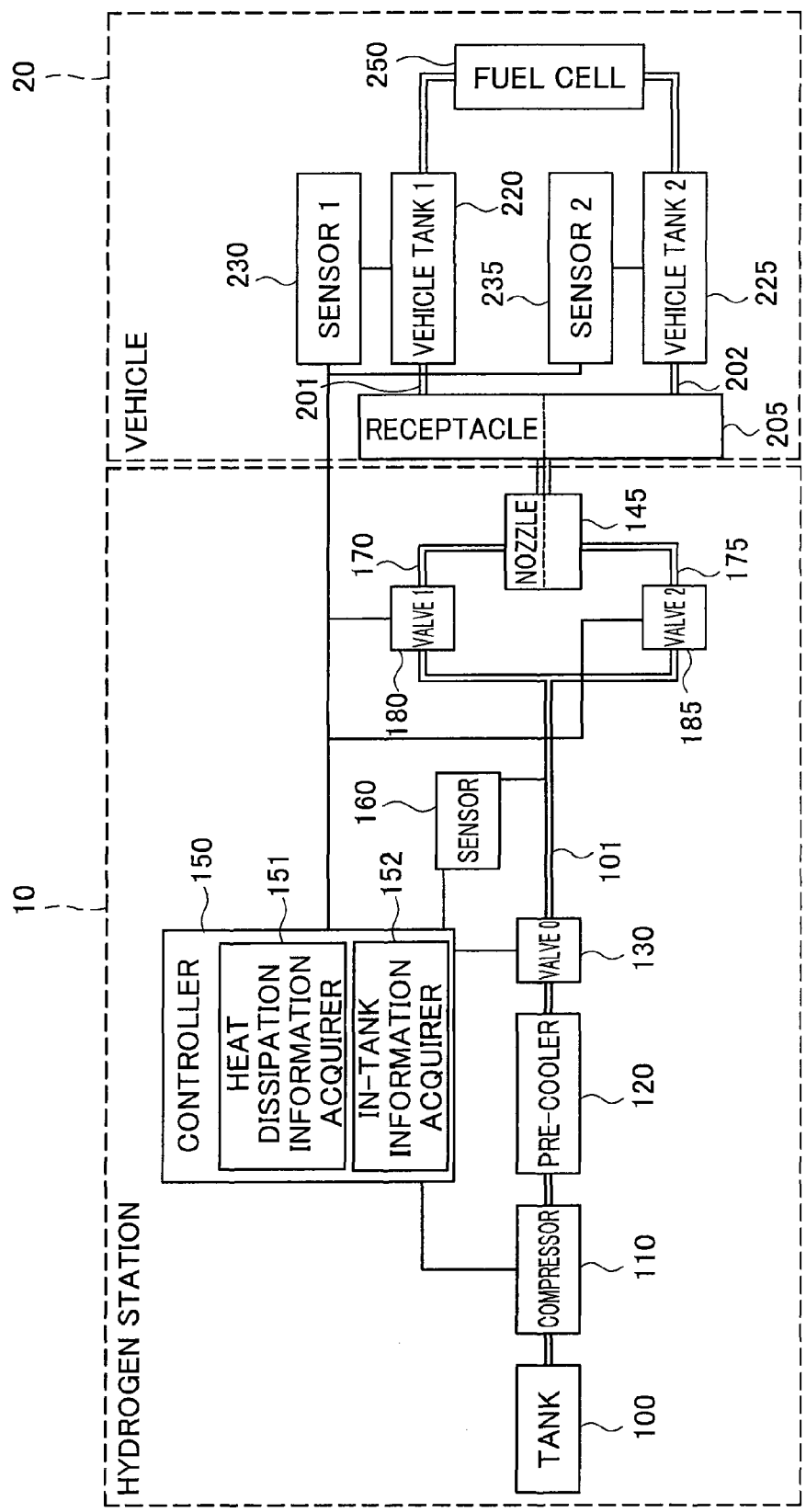
FIG. 15 illustrates a system configuration in which a gas filler passage branches off in the hydrogen station.

FIG. 15 illustrates a system configuration in which a gas filler passage branches off in the hydrogen station. According to this modification, a gas filler passage 101 branches off to two gas filler passages 170 and 175 in the hydrogen station, and electrically-operated valves 180 and 185 are provided in the respective gas filler passages 170 and 175. A nozzle 145 has inside separated into two parts, which are respectively connected with the gas filler passages 170 and 175. The vehicle 20 has a common receptacle 205 having the parted structure to receive the internally-parted nozzle 145. As described, the hydrogen station 10 may have two gas filler passages 170 and 175.

The foregoing has described the invention in detail with reference to some embodiments. The embodiments of the invention described above are only illustrative for the purpose of better understanding of the invention, and the invention is not limited to these embodiments in any sense. Various variants and modifications may be made to the embodiments without departing from the spirit and the scope of the invention. The invention includes such variants, modifications and equivalents.

DESCRIPTION OF MARK

10 Hydrogen Station
20 Vehicle
100 Tank
110 Compressor
120 Pre-cooler
130 electrically-operated valve
140, 145 Nozzle
150 Controller
151 Heat Dissipation Information Acquirer
152 In-Tank Information Acquirer
200, 205 Receptacle
210 First electrically-operated valve
215 Second electrically-operated valve
220 First Vehicle Tank
225 Second vehicle Tank
230 First sensor
235 Second sensor
240 Controller
241 Heat Dissipation Information Acquirer
242 In-Tank Information Acquirer
250 Fuel cell

The invention claimed is:

1. A gas filling device configured to fill a gas into a plurality of tanks provided to store the gas through separate gas filler passages with respective valves, the gas filling device comprising:
a gas supplier configured to supply the gas to the gas filler passages; and
a controller configured to separately open and close each of the valves provided in the respective gas filler passages, so as to control gas flows supplied from the gas supplier, wherein the controller comprises:
a heat dissipation information acquirer configured to obtain heat dissipation information regarding heat dissipation capacity of each of the plurality of tanks; and
an in-tank information acquirer configured to obtain information regarding at least one of temperature and pressure in each of the plurality of tanks, and
wherein the controller causes opening and closing of the valves to sequentially fill the gas into the plurality of tanks one by one, and then to allow communication between the separate gas filler passages after the plurality of tanks are filled with the gas, based on the heat dissipation information obtained by the heat dissipation information acquirer and the information in the tank obtained by the in-tank information acquirer.

2. The gas filling device according to claim 1, wherein after the gas is supplied through the separate gas filler passages to be filled into the plurality of tanks, the heat dissipation information acquirer of the controller calculates and obtains heat dissipation information with respect to each of the plurality of tanks, based on the information obtained by the in-tank information acquirer.

3. The gas filling device according to claim 1, wherein the controller is configured to perform a first gas filling process comprising the steps of:
(a) filling the gas into a first tank of higher heat dissipation capacity of the plurality of tanks, based on the heat dissipation information;
(b) stopping the gas filling into the first tank, and filling the gas into a second tank of lower heat dissipation capacity; and
(c) stopping the gas filling into the second tank, and allowing communication between the first tank and the second tank.

4. The gas filling device according to claim 3, wherein the first gas filling process performed by the controller further comprises the step of:
(d) filling the gas into the first tank and the second tank, after the step (c).

5. The gas filling device according to claim 3, wherein the controller stops the gas filling into the first tank when either gas temperature or gas pressure in the first tank reaches a preset value in the step (b).

6. The gas filling device according to claim 3, wherein the controller stops the gas filling into the second tank when either gas temperature or gas pressure in the second tank reaches a preset value in the step (c).

7. The gas filling device according to claim 3, wherein the controller is further configured to perform a second gas filling process of simultaneously filling the gas into the first tank and the second tank, and
the controller selectively performs either the first gas filling process or the second gas filling process, based on the information in the tank prior to gas filling, which is obtained by the in-tank information acquirer.

8. The gas filling device according to claim 7, wherein
the controller performs the second gas filling process when pressures in the first tank and in the second tank prior to the gas filling are not greater than a preset pressure level which is determined according to temperatures in the first tank and in the second tank.

9. A gas filling system configured to supply a gas from a gas filling device to a moving device,
the gas filling system comprising the moving device and the gas filling device,
the moving device comprising:
a plurality of tanks configured to store the supplied gas;
separate gas filler passages connected with the plurality of tanks; and
valves provided in the separate gas filler passages, wherein
the gas filling device comprises a gas supplier configured to supply the gas to the gas filler passages,
at least one of the moving device and the gas filling device comprises a controller configured to separately open and close each of the valves, so as to control a gas flow supplied from the gas supplier to corresponding one of the gas filler passages, wherein
the controller comprises:
a heat dissipation information acquirer configured to obtain heat dissipation information regarding heat dissipation capacity of each of the plurality of tanks; and
an in-tank information acquirer configured to obtain information regarding at least one of temperature and pressure in each of the plurality of tanks, and
the controller causes opening and closing of the valves to sequentially fill the gas into the plurality of tanks and, after gas filling into the plurality of tanks, to allow communication between the separate gas filler passages, based on the heat dissipation information obtained by the heat dissipation information acquirer and the information in the tank obtained by the in-tank information acquirer.

10. The gas filling system according to claim 9, wherein
the controller is configured to perform a first gas filling process comprising the steps of:
(a) filling the gas into a first tank of higher heat dissipation capacity of the plurality of tanks, based on the heat dissipation information;
(b) stopping the gas filling into the first tank, and filling the gas into a second tank of lower heat dissipation capacity; and
(c) stopping the gas filling into the second tank, and allowing communication between the first tank and the second tank.

11. A gas filling method of filling a gas through separate gas filler passages to a plurality of tanks provided to store the gas, the gas filling method comprising:
(a) obtaining heat dissipation information regarding heat dissipation capacity of each of the plurality of tanks;
(b) separately opening and closing each of valves provided in the respective gas filler passages, so as to control a gas flow supplied from the gas supplier;
(c) obtaining information regarding at least one of temperature and pressure in each of the plurality of tanks; and
(d) opening and closing each of the valves to sequentially fill the gas into the plurality of tanks and, after gas filling into the plurality of tanks, to allow communication between the separate gas filler passages, based on the heat dissipation information obtained by the step (a) and the information in the tank obtained by the step c).

12. The gas filling method according to claim 11, wherein
the step (d) comprises:
(d-1) filling the gas into a first tank of higher heat dissipation capacity of the plurality of tanks using a first gas filler passage, based on the heat dissipation information;
(d-2) stopping the gas filling into the first tank, and filling the gas into a second tank of lower heat dissipation capacity using a second gas filler passage; and
(d-3) stopping the gas filling into the first tank and the second tank, and connecting the first gas filler passage with the second gas filler passage to allow communication between the first tank and the second tank.

13. A moving device, comprising:
a plurality of tanks provided to store a gas supplied;
a plurality of sensors, each being configured to measure at least one of gas temperature and gas pressure in each of the plurality of tanks;
separate gas filler passages connected with the plurality of tanks;
valves provided in the separate gas filler passages; and
a controller configured to separately open and close each of the valves, so as to control a gas flow supplied from a gas supplier, wherein
the controller comprises:
a heat dissipation information acquirer configured to obtain heat dissipation information regarding heat dissipation capacity of each of the plurality of tanks; and
an in-tank information acquirer configured to obtain information regarding at least one of temperature and pressure in each of the plurality of tanks, and
the controller causes opening and closing of the valves to sequentially fill the gas into the plurality of tanks and, after gas filling into the plurality of tanks, to allow communication between the separate gas filler passages, based on the heat dissipation information obtained by the heat dissipation information acquirer and the information in the tank obtained by the in-tank information acquirer.

14. The moving device according to claim 13, wherein
the controller is configured to perform a gas filling process comprising:
(a) filling the gas into a first tank of higher heat dissipation capacity of the plurality of tanks, based on the heat dissipation information;
(b) stopping the gas filling into the first tank, and filling the gas into a second tank of lower heat dissipation capacity; and
(c) stopping the gas filling into the second tank, while allowing communication between the first tank and the second tank.

15. The moving device according to claim 14, wherein
the plurality of tanks are at least three tanks and include at least two first tanks, and
the controller sequentially selects one of the at least two first tanks to fill the gas into the selected first tank in the step (a) in each cycle of the first filling process, and fills the gas into a remaining non-selected first tank and the second tank in the step (b).

16. The moving device according to claim 14, wherein
the second tank is lighter in weight than the first tank.

* * * * *

UNITED STATES PATENT AND TRADEMARK OFFICE
CERTIFICATE OF CORRECTION

PATENT NO. : 8,522,834 B2
APPLICATION NO. : 13/502642
DATED : September 3, 2013
INVENTOR(S) : E. Okawachi It is certified that error appears in the above-identified patent and that said Letters Patent is hereby corrected as shown below:

In the Specification

At Column 8, please change Equation (1) from:

$$\text{``} \quad T2 = \frac{Y*P_2*T_1*T_{in}}{(P_2-P_1)*T_1+Y*P_1*T_{in}} \quad (1) \quad \text{''}$$

to $$-- \quad T_2 = \frac{\gamma * P_2 * T_1 * T_{in}}{(P_2 - P_1)*T_1 + \gamma * P_1 * T_{in}} \quad (1) \quad --$$

Signed and Sealed this
Fifteenth Day of April, 2014

Michelle K. Lee
*Deputy Director of the United States Patent and Trademark Office*